(12) United States Patent
Tolman et al.

(10) Patent No.: US 6,788,496 B2
(45) Date of Patent: Sep. 7, 2004

(54) NARROW TOP POLE OF A WRITE ELEMENT

(75) Inventors: Charles H. Tolman, Bloomington, MN (US); Nurul Amin, Saint Paul, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 241 days.

(21) Appl. No.: 09/934,816

(22) Filed: Aug. 22, 2001

(65) Prior Publication Data

US 2003/0039066 A1 Feb. 27, 2003

(51) Int. Cl.[7] .............................................. G11B 5/147
(52) U.S. Cl. ...................................................... 360/126
(58) Field of Search ................................. 360/126, 119

(56) References Cited

U.S. PATENT DOCUMENTS

| | | | |
|---|---|---|---|
| 4,772,976 A | 9/1988 | Otomo et al. ............... 360/125 |
| 4,894,098 A | 1/1990 | Otomo et al. ............... 148/122 |
| 4,992,901 A | 2/1991 | Keel et al. .................... 360/110 |
| 5,116,719 A | 5/1992 | Gau ............................ 430/313 |
| 5,200,056 A | 4/1993 | Cohen et al. ................ 205/122 |
| 5,406,434 A | 4/1995 | Amin et al. .................. 360/126 |
| 5,652,687 A | * 7/1997 | Chen et al. ................... 360/126 |
| 5,699,605 A | 12/1997 | Amin et al. ................. 29/603.14 |
| 5,751,526 A | 5/1998 | Schemmel .................. 360/113 |
| 5,752,309 A | 5/1998 | Partee et al. ............... 29/603.18 |
| 6,054,023 A | 4/2000 | Chang et al. ............. 204/192.2 |
| 6,156,487 A | 12/2000 | Jennison et al. ............ 430/316 |
| 6,483,672 B1 | 11/2002 | Arnett et al. ................ 360/313 |
| 2001/0015871 A1 | 8/2001 | Niwa .......................... 360/122 |

FOREIGN PATENT DOCUMENTS

| JP | 60038713 A | 2/1985 |
|---|---|---|
| JP | 401159816 A | 6/1989 |
| JP | 403093017 A | 4/1991 |
| JP | 405189720 A | 7/1993 |
| JP | 409231510 A | 9/1997 |

OTHER PUBLICATIONS

Office Communication from the United States Patent and Trademark Office dated Dec. 18, 2003 for Application No. 10/054,272 with a filing date of Jan. 22, 2002.

"Definition of Write Gap in Recording Head with Plating and Ion–Implantation," Feb. 1, 2002, IBM Technical Disclosure Bulletin, Iss. No. 454, p. 302.

* cited by examiner

Primary Examiner—Robert S. Tupper
(74) Attorney, Agent, or Firm—Westman, Champlin & Kelly

(57) ABSTRACT

In a method of manufacturing a top pole of a write element for use in a disc drive storage system, a first trench is formed on a top surface of a bottom pole, the first trench includes a first opening defined by opposing first side walls and an exposed portion of the top surface located therebetween. Next, a second trench is formed within the first trench. The second trench includes a second opening defined by opposing second side walls formed adjacent the first side walls and a gap member formed on the exposed portion of the top surface of the bottom pole between the second side walls. Finally, a top pole is formed in the second opening, which is narrower than the first opening.

15 Claims, 7 Drawing Sheets

FIG. 5.1
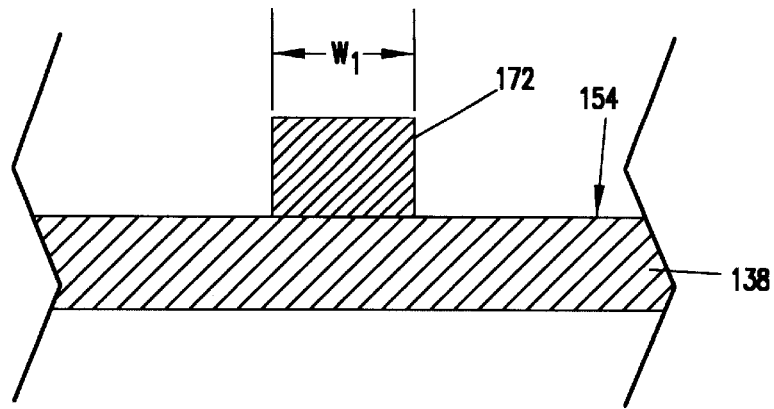
FIG. 5.2
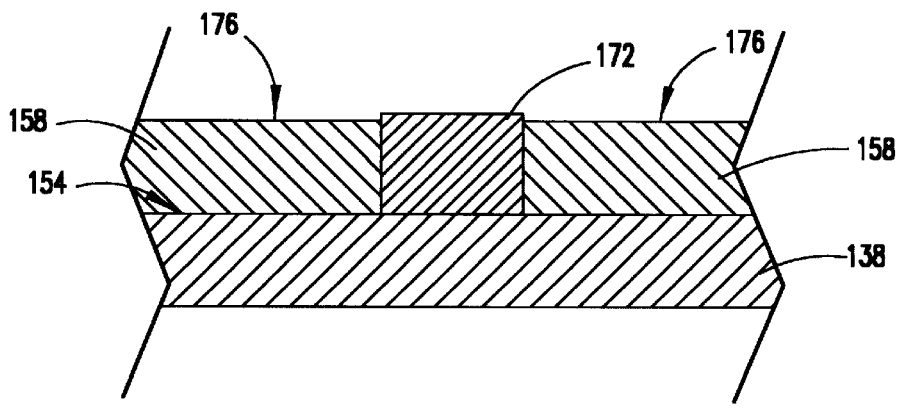
FIG. 5.3
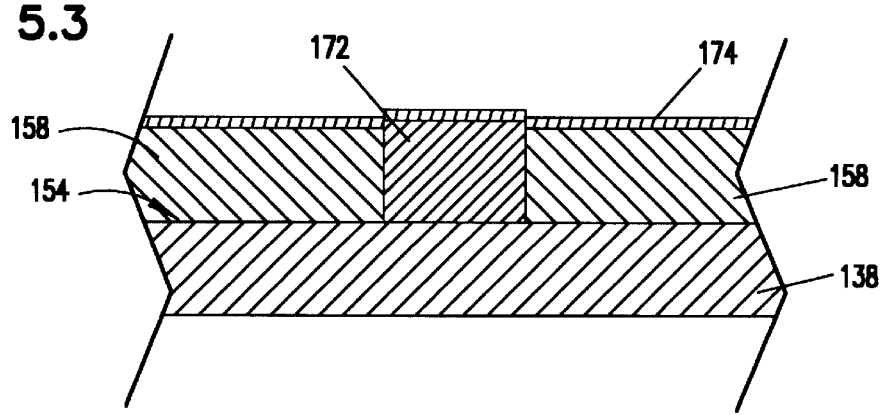

FIG. 5.4
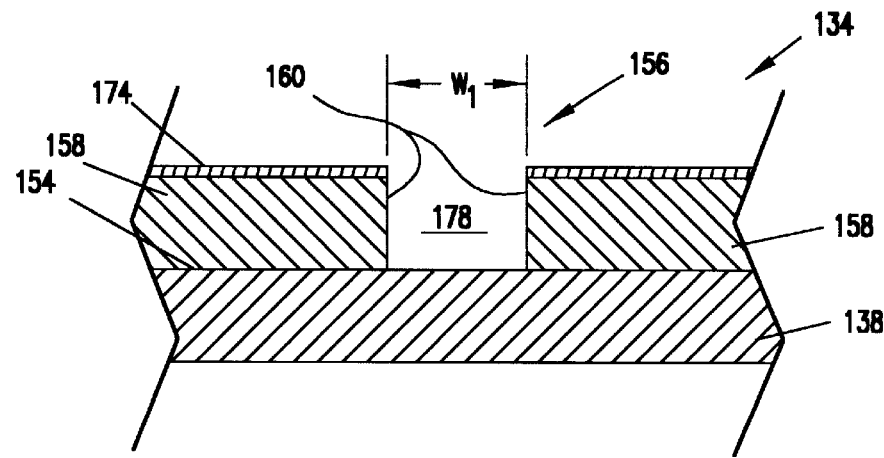
FIG. 5.5
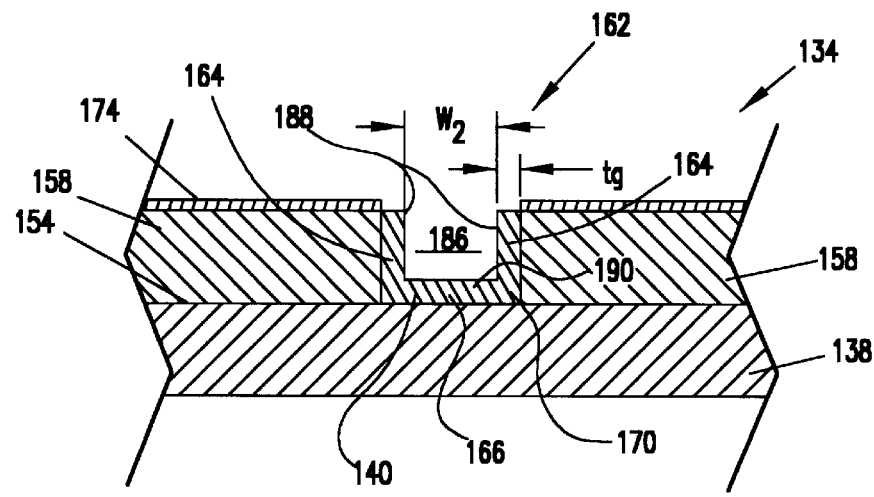
FIG. 5.6
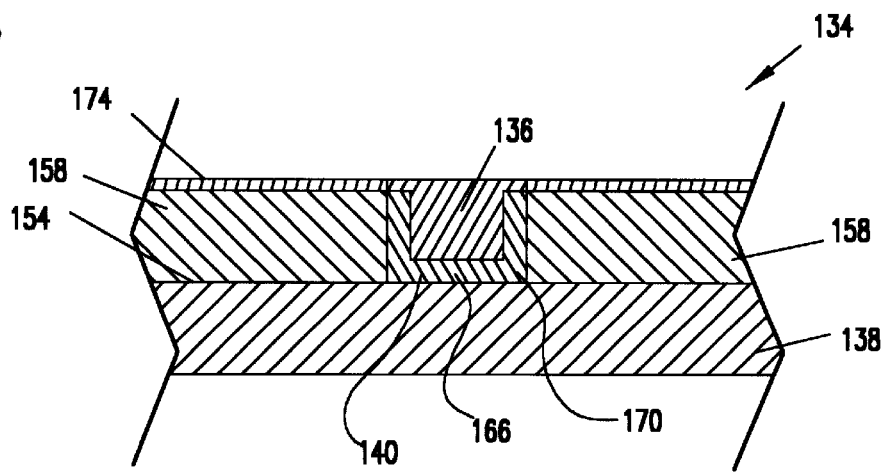

FIG. 6.1
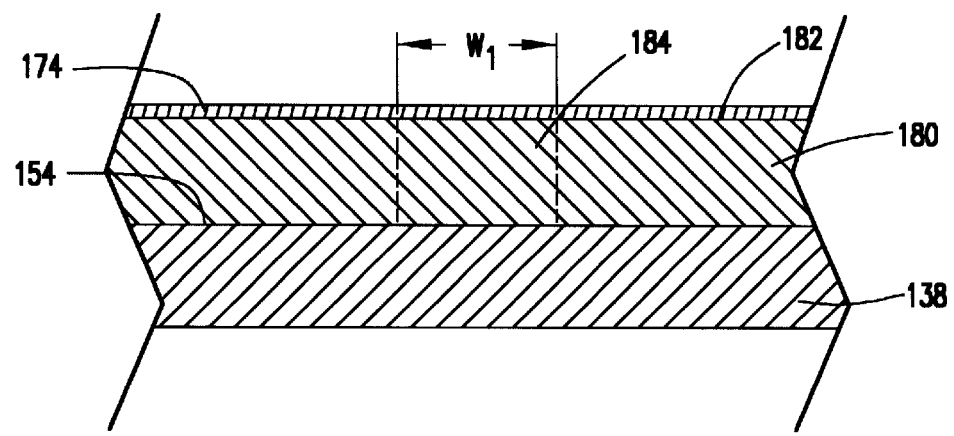
FIG. 6.2
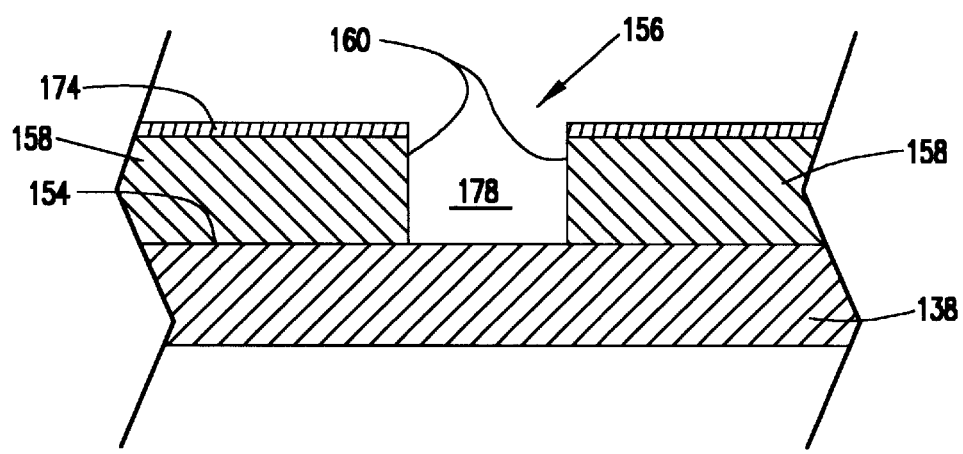

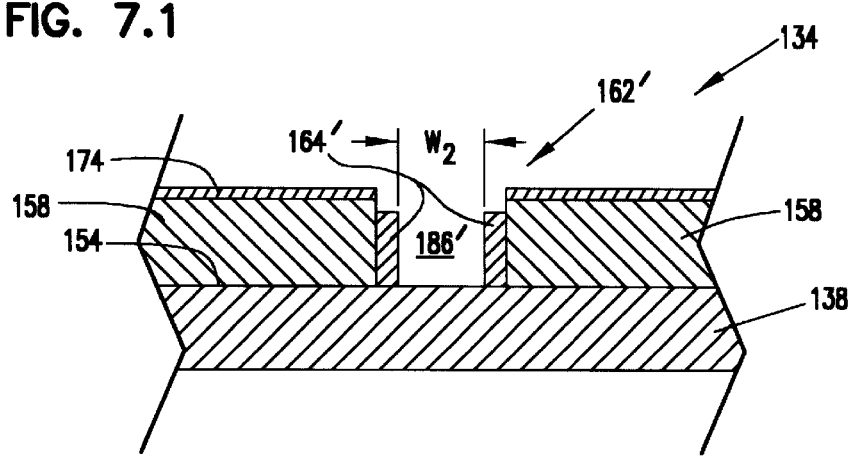
FIG. 7.1
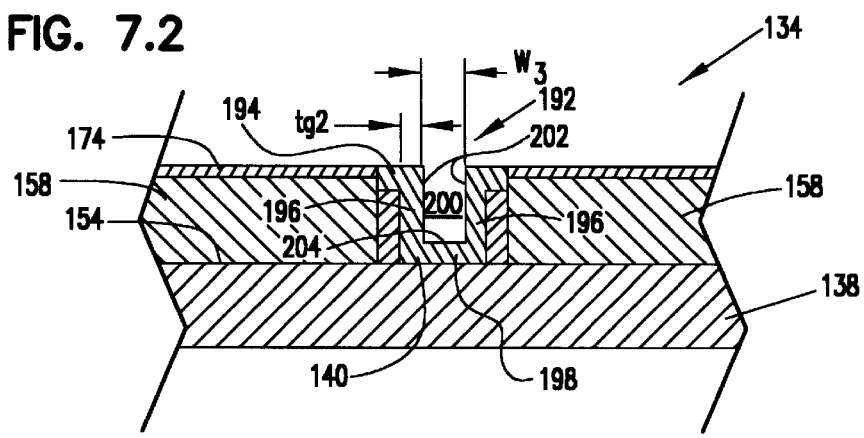
FIG. 7.2
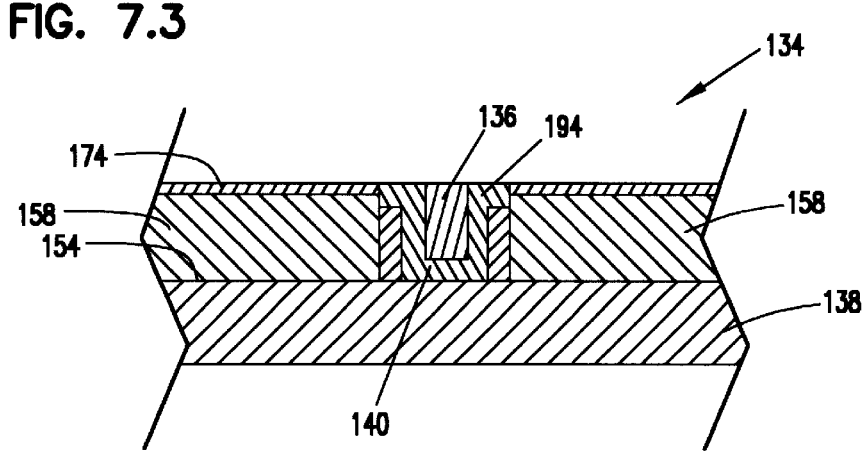
FIG. 7.3

NARROW TOP POLE OF A WRITE ELEMENT

FIELD OF THE INVENTION

The present invention relates to a magnetic write element for use with disc drive storage systems. More particularly, the present invention relates to a magnetic write element having a narrow top pole and a method of forming the same.

BACKGROUND OF THE INVENTION

Thin film magnetic read/write heads, such as magnetoresistive (MR) and giant magnetoresistive (GMR) read/write heads are commonly used in disc drive storage systems. These read/write heads typically include separate read and write elements for reading data from and writing data to a magnetic disc. One advantage to this configuration is that the read and write elements can be optimized for the particular task they are to perform.

The write element of the read/write head generally includes a conductor coil, a bottom pole, and a top pole separated from the bottom pole by a writer gap. In operation, an air bearing surface (ABS) side of the top pole, bottom pole, and writer gap face, and are in close proximity to the rotating magnetic disc. During a write operation, an electrical current is caused to flow in the conductor coil, which induces a magnetic field in the top and bottom poles, that extends across the writer gap therebetween and into the rotating disc. This causes magnetic moments, which represent bits of data, to be impressed upon the disc in concentric circular tracks.

There is a never ending demand for higher data storage capacity in disc drives. One measure of the data storage capacity is the areal density of the bits at which the disc drive is capable of reading and writing. The areal density is generally defined as the number of bits per unit length along a track (linear density in units of bits per inch) multiplied by the number of tracks available per unit length in the radial direction of the disc (track density in units of track per inch or TPI). Currently, there is a need for areal densities on the order of 100 Gb/in$^2$ which requires track density on the order of 200–350 kTPI and greater.

One limiting factor to the track density, at which a disc drive is capable of operating, is the track width within which data can be written by the write element. The track width of the write element is generally defined by the width of the top pole. The above-mentioned track density demands generally require top pole widths in the sub-micron ($\mu$m) range or on the order of 0.1 to 0.2 $\mu$m. Furthermore, the top pole must be formed very accurately (e.g., within +/−0.01 $\mu$m). These constraints push the resolution capabilities of conventional photolithographic processing techniques thereby making it extremely difficult to pattern such narrow top poles. The resulting top pole widths that can be accurately formed using conventional photolithographic techniques are on the order of 0.6 $\mu$m. As a result, new processing techniques are required to accurately form top pole structures having sufficiently small widths that will allow a write element to satisfy the demands for high TPI.

Therefore, a continuing need exists for improved methods of forming a top pole of a write element having a sub-micron track width.

SUMMARY OF THE INVENTION

The present invention provides a method of manufacturing a top pole of a write element having a narrow width that allows the write element to record data at a high areal density to satisfy current and future demands for increased data storage. In the method, a first trench is formed on a top surface of a bottom pole. The first trench includes a first opening defined by opposing first side walls and an exposed portion of the top surface located therebetween. Next, a second trench is formed within the first trench. The second trench includes a second opening defined by opposing second side walls formed adjacent the first side walls and a gap member formed on the exposed portion of the top surface of the bottom pole between the second side walls. Finally, the top pole is formed in the second opening which is narrower than the first opening.

In another embodiment, the thickness of the gap member of the second trench is reduced, and a third trench is formed within the modified second trench. The top pole is then formed within a third opening of the third trench that is narrower than the second opening.

Also disclosed is a write element for use in a head of a disc drive storage system that includes a narrow top pole formed in accordance with the above method.

Additional features and benefits of the present invention will become apparent with the careful review of the following drawings and the corresponding detailed description.

BRIEF DESCRIPTION OF THE DRAWINGS

FIGS. 5.1–5.6 show cross-sectional views of a write element as seen in plane 4—4 of FIG. 2 which illustrate various steps taken during the manufacturing of the write element in accordance with a method of the invention.

FIGS. 6.1 and 6.2 show cross-sectional views of a write element as seen in plane 4—4 of FIG. 2 which illustrate the manufacturing steps taken to form a first trench in accordance with an embodiment of the invention.

FIGS. 7.1–7.3 show cross-sectional views of a write element as seen in plane 4—4 of FIG. 2 which illustrate manufacturing steps that are taken to form a second trench in accordance with an embodiment of the invention.

DETAILED DESCRIPTION OF ILLUSTRATIVE EMBODIMENTS

Figure 1:
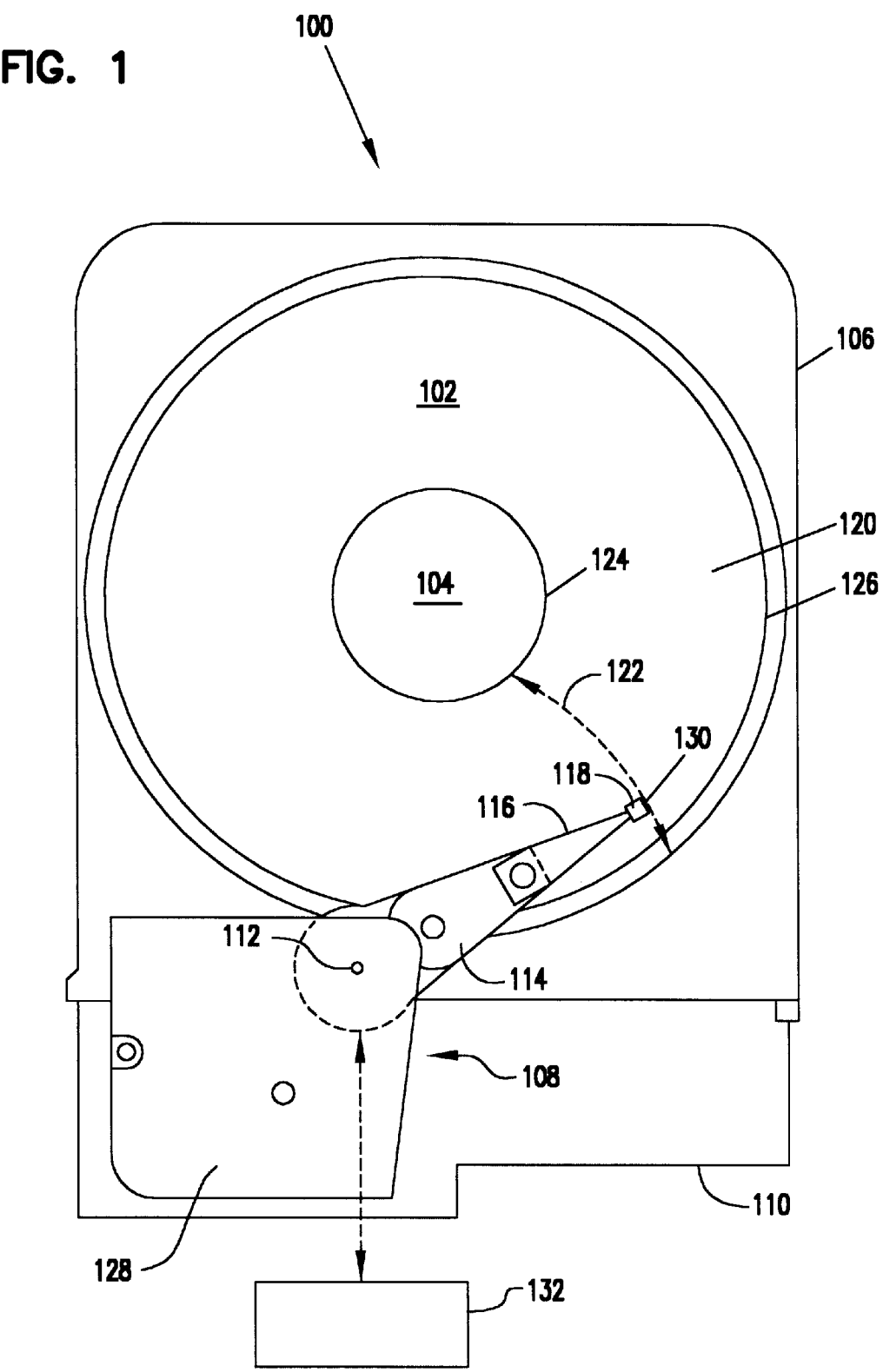
FIG. 1 is a top view of a disc drive storage system with which embodiments of the present invention may be used.

FIG. 1 is a top view of a disc drive 100, with which embodiments of the present invention may be used. Disc drive 100 includes a magnetic disc 102 mounted for rotational movement about an axis 104 and driven by spindle motor (not shown). The components of disc drive 100 are contained within a housing that includes base 106 and a cover (not shown). Disc drive 100 also includes an actuator 108 mounted to a base plate 110 and pivotally moveable to disc 104 about axis 112. Actuator mechanism 108, includes actuator arm 114 and suspension assembly 116. Slider 118 is coupled to suspension assembly 116 through a gimbaled attachment which allows slider 118 to pitch and roll as it rides on an air bearing above surface 120 of disc 102. Actuator mechanism 108 is adapted to rotate slider 118 on arcuate path 122 between an inner diameter 124 and an outer diameter 126 of disc 102. A cover 128 can cover a portion of actuator mechanism 108. Slider 118 supports a head 130 having separate read and write transducing elements for reading information from and writing information to disc 102.

During operation, as disc 102 rotates, air (and/or a lubricant) is dragged under air bearing surfaces (ABS) of slider 118 in a direction approximately parallel to the tangential velocity of disc 102. As the air passes beneath the bearing surfaces, air compression along the air flow path causes the air pressure between disc surface 120 and the bearing surfaces to increase, which creates a hydrodynamic lifting force that counteracts a load force provided by suspension 116 and causes slider 118 to "fly" above and in close proximity to disc surface 120. This allows slider 118 to support head 130 in close proximity to the disc surface 120.

Drive controller 132 controls actuator mechanism 108 through a suitable connection. Drive controller 132 can be mounted within disc drive 100 or located outside of disc drive 100. During operation, drive controller 132 receives position information indicating a portion of disc 102 to be accessed. Drive controller 132 receives the position information from an operator, from a host computer, or from another suitable controller. Based on the position information, drive controller 132 provides a position signal to actuator mechanism 108. The position signal causes actuator mechanism 108 to pivot about axis 112. This, in turn, causes slider 118 and the head 130 it is supporting to move radially over disc surface 120 along path 122. Once head 130 is appropriately positioned, drive controller 132 then executes a desired read or write operation.

Figure 2:
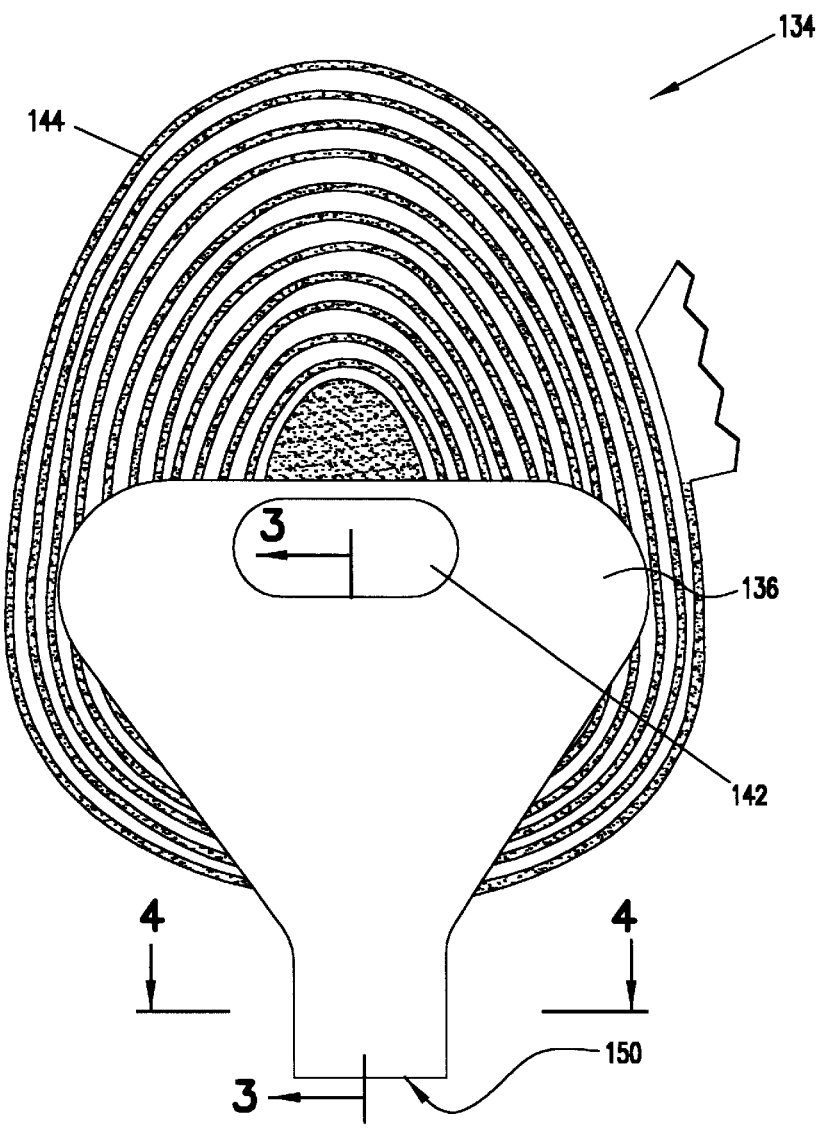
FIG. 2 shows a top view of a write element of a read/write head.
Figure 3:
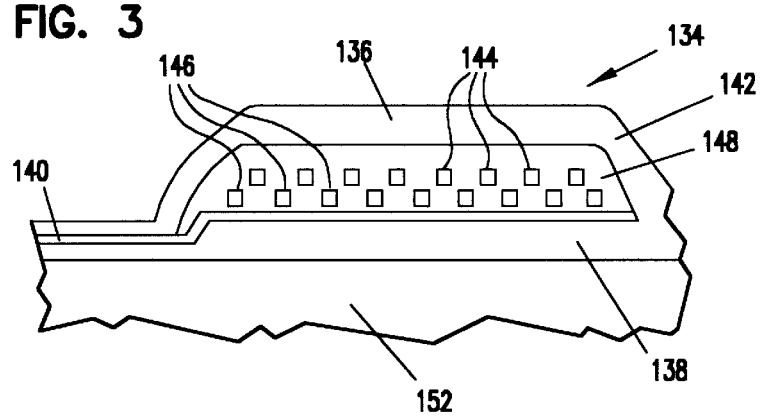
FIG. 3 is a cross-sectional view of the write element of FIG. 2 as seen in plane 3—3.

A multi-turn inductive thin film write element 134 of head 130 is shown schematically in FIGS. 2 and 3. FIG. 2 is a top view of write element 134 and FIG. 3 is a cross-sectional view as seen in plane 3—3 of FIG. 2. Write element 134 includes top pole 136 and bottom pole 138, which are separated by a writer gap layer 140. Top pole 136 is preferably formed of a magnetic conductive material, such as cobalt-iron (CoFe), cobalt-nickel-iron (CoNiFe), nickel-iron (NiFe), cobalt (Co), or other suitable magnetic conductive material. Bottom pole 138 is preferably formed of a conductive magnetic material such as a nickel-iron (NiFe) alloy. Top pole 136 and bottom pole 138 contact each other at back gap "via" 142 and form the two poles of write element 134. Conductive coils 144 and 146 extend between top pole 136 and bottom pole 138. An insulating material 148 electrically insulates conductors 144 and 146 from top and bottom poles 136 and 138. Top pole 136, bottom pole 138 and writer gap 140 include a pole tip region 150 (FIG. 2) that faces disc surface 120 and forms a portion of the air bearing surface (ABS) of slider 118.

The components of write element 134 are deposited upon a nonmagnetic substrate 152, which typically comprises a ceramic composite compound, such as $Al_2O_3$—TiC. Also, an insulating material, such as an $Al_2O_3$ base coat (not shown), can separate the substrate 152 and bottom pole 138. A separate read element (not shown) can also be included to form a merged read/write head 130 in accordance with known methods. The read element could be magnetoresistive sensor, a spin valve sensor, or other suitable read element known in the art.

Figure 4:
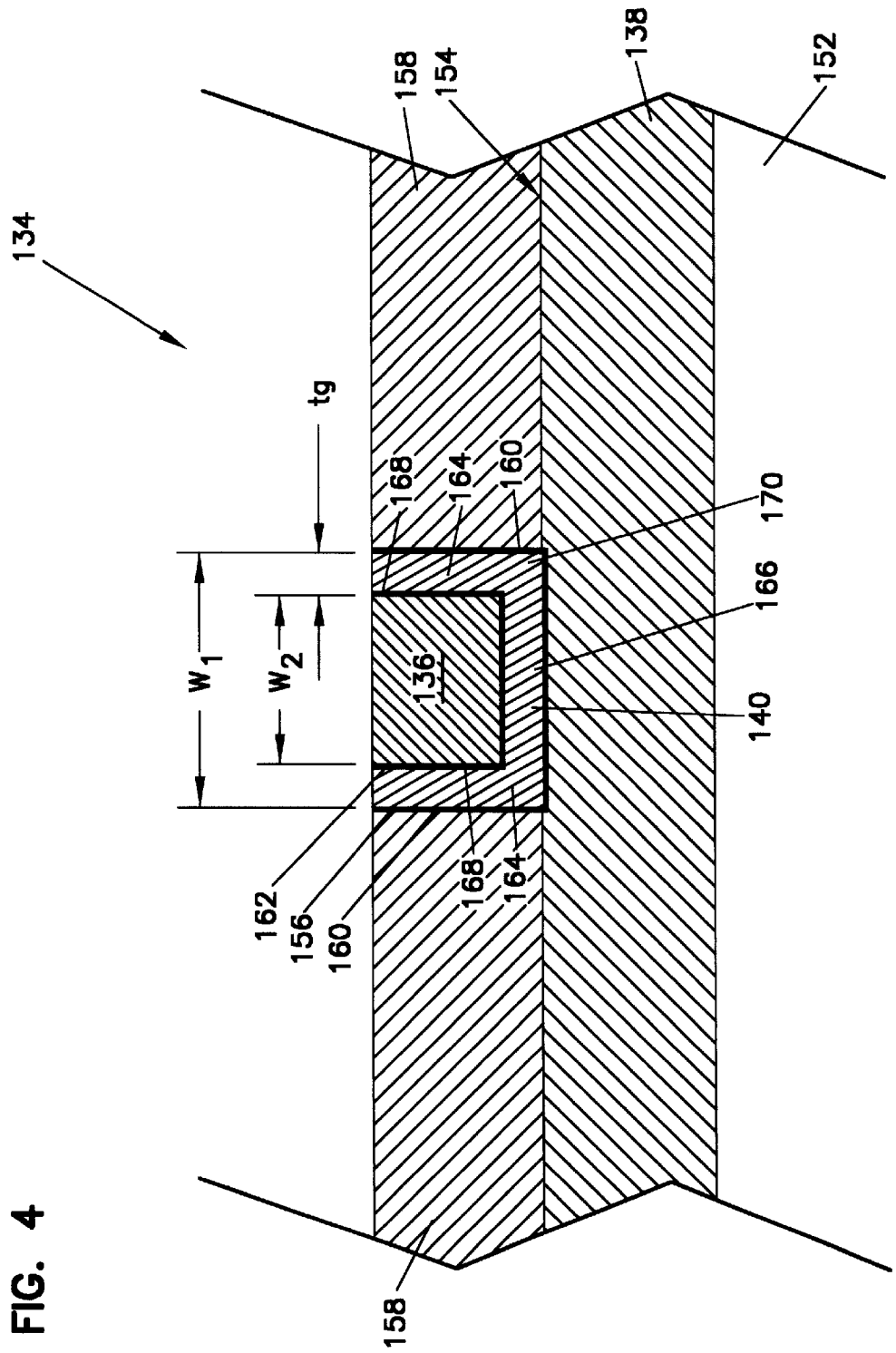
FIG. 4 is a cross-sectional view of a write element as seen in plane 4—4 of FIG. 2 in accordance with an embodiment of the invention.

One aspect of the present invention is directed toward a write element 134 having a narrow top pole 136 at the pole tip region 150 for use in disc drive storage systems to provide high areal density recording capability. FIG. 4 is a partial ABS view of a write element 134, taken along line 4—4 of FIG. 2, in accordance with one embodiment of the invention. To simplify the illustrations, the components of write element 134 are not shown to scale. Write element 134 includes bottom pole 138 having top surface 154. A first trench 156 (outlined by the thick line) is formed on top surface 154 and is defined by first side walls 158 and the portion of top surface 154 located therebetween. First trench 156 has a first trench opening defined by inside edges 160 of first side walls 158 and the portion of top surface 154 located therebetween. A second trench 162 (outlined by the thick line) is formed within first trench 156 and includes a second opening defined by opposing second side walls 164 and a gap member 166. Gap member 166 forms a part of writer gap layer 140 (FIG. 3). Gap member 166 is formed on top surface 154 of bottom pole 138 and extends between inside edges 168 of second side walls 164. Top pole 136 is formed within the second opening of second trench 162.

The first opening of first trench 156 has a first width $W_1$ defined as the distance separating inside edges 160 of first side walls 158. The second opening of second trench 162 has a second width $W_2$, corresponding to the distance separating inside edges 168, that is less than the first width $W_1$. Second width $W_2$ defines the width of top pole 136 and, therefore, a track width for write element 134.

As will be discussed in greater detail below, first width $W_1$ is sized in accordance with the dimensions that are obtainable with a reasonable degree of accuracy using conventional photolithographic processing techniques, which are on the order of 0.5 micrometers ($\mu$m) +/−0.05 $\mu$m. Second trench 162 is generally formed over first trench 156 by electroplating a non-magnetic gap layer 170 over second side walls 164 and top surface 154 located therebetween. The electroplating process is a highly accurate and controllable process that is capable of forming an extremely thin layer of material on the desired surface. As a result, the first opening of first track 156 is narrowed by the formation of second trench 162. This results in the formation of a second opening having a second width $W_2$ that is less than the first width $W_1$ that is obtainable using conventional photolithographic techniques. The first width $W_1$ is reduced by twice the thickness $t_g$ of second side walls 164 or gap layer 170. A track width ($W_2$) of top pole 136 can therefore be realized that is considerably narrower than the original first width $W_1$ of first track 156 formed using conventional photolithographic techniques.

With reference to FIGS. 5.1–5.6, a method of forming write element 134 depicted in FIG. 4 will be discussed in accordance with one embodiment of the invention. In FIG. 5.1, a first trench opening portion 172, formed of a non-conductive material, is deposited on top surface 154 of bottom pole 138. First trench opening portion 172 defines the desired first opening of first trench 156 and is formed of photoresist that is deposited using conventional photolithographic methods. For example, first trench opening forming portion 172 can be formed by first depositing a layer of photoresist across top surface 154 of bottom pole 138. A mask can then be placed on the photoresist layer to cover the desired first trench opening portion 172 while leaving the remainder of the photoresist layer exposed. The mask and photoresist layer can then be exposed to ultraviolet radiation, and a chemical etch removes the portion of the photoresist layer that was exposed to the radiation. This process results in the formation of first trench forming portion 172 on top surface 154 of bottom pole 138. Those skilled in the art understand that other conventional photolithographic methods exist that can be used to form first trench forming layer 172.

In FIG. 5.2, first side walls 158 are electroplated to top surface 154 of bottom pole 138 in accordance with conventional electroplating methods. Typical plating processes are wet processes wherein the substrate on which bottom pole 138 is formed is placed in an electrolyte and a potential is applied between top surface 154 and the plating material. Metallic ions from the plating material are then deposited on the desired surface. Since, first trench forming portion 172 is not a conductive material, the plating material is not plated to it. Accordingly, first side walls 158 are formed of a non-magnetic conductive material, such as palladium-nickel (PdNi) or other conductive material that is suitable for plating.

FIG. 5.3 shows an optional step of depositing an electrical non-conductive insulating layer 174 over top surface 176 (FIG. 5.2) of first side walls 158 and first opening forming portion 172. This step is implemented to prevent the electroplating of material on top surface 176 of first side walls 158 during subsequent electroplating process steps. If this step is not performed, subsequent plating of, for example, gap layer 170 (FIG. 4) will be formed on top surface 176 of first side walls 158.

In FIG. 5.4, first trench forming portion 172 and the portion of insulation layer 174 deposited thereon are removed using a chemical etching process and/or a photoresist developing (removal) process. This step completes the formation of first trench 156 having first opening 178. Other methods for forming first trench 156 can also be used.

FIGS. 6.1 and 6.2 illustrate steps of another method of forming first trench 156 in accordance with the present invention. In FIG. 6.1, a first trench forming layer 180 is formed on top surface 154 of bottom pole 138. An optional non-conductive insulating layer 174 is shown deposited on top surface 182 of first trench forming layer 180. Insulating layer 174 prevents the electroplating of material on the top surface 182 during subsequent electroplating process steps. First trench forming layer 180 is formed of a non-magnetic conductive material, such as nickel-phosphorous (NiP or PdNi) and includes a first trench opening portion 184 (located within the dashed lines) having a width corresponding to the first width $W_1$ of first trench opening 178. First trench 156 (FIGS. 4 and 5.4) is formed by removing the first trench opening portion 184 using a conventional anisotropic etching process, such as reactive ion etching (RIE) or ion mill, as shown in FIG. 6.2. Thus, the removal of first trench opening portion 184 results in the formation of first side walls 158 and exposes top surface 154 of bottom pole 138 located between inside edges 160.

Referring now to FIG. 5.5, second trench 162 is formed within first trench 156 by electroplating gap layer 170 to inside surfaces 160 of first side walls 158 and top surface 154 located therebetween, using a conventional electroplating process. Gap layer 170 is preferably formed of a non-magnetic conductive material, such as chromium (Cr), palladium (Pd), gold, copper or other non-magnetic conductive material and has a thickness $t_g$. Gap layer 170 can be formed of multiple layers of the same or different material. This step forms second trench 162 having a second opening 186 defined by inside edges 188 of second side walls 164 and a top surface 190 of gap member 166.

In the final step, shown in FIG. 5.6, top pole 136 is formed within second opening 186 of first trench 40. This can be accomplished using a conventional plating (shown) or a deposition technique, such as sputter deposition. The resulting write element 134 can then be lapped in accordance with conventional methods to remove insulating layer 174 and any portion of top pole 136 that lies outside of second trench 162 to ensure that top pole 136 is completely contained within second trench 162. This completes the formation of the embodiment of writer element 134 shown in FIG. 4.

Although the above method has the benefit of accurately narrowing the first opening 178 of first trench 156 that is formed using conventional photolithographic techniques, it is generally limited by the thickness of writer gap layer 140 (FIG. 3). This is due to the fact that gap member 166 of gap layer 170 forms writer gap 140 and, therefore, its thickness $t_g$ is limited to the thickness desired for writer gap 140. The thickness of writer gap 140 is typically in the range of 0.05–0.15 µm. Consequently, the above method can reduce the first width $W_1$ of first trench 156 by a maximum of twice the thickness $t_g$ of the desired writer gap 140. For example, a first trench 156 formed in accordance with conventional photolithographic methods, can have a first width $W_1$ on the order of 0.5 µm, which can be reduced to second width $W_2$ on the order of 0.3 µm where the gap layer 170 has a thickness $t_g$ of 0.15 µm. However, this limitation can be overcome.

One method of overcoming the above-identified limitation is to reduce the thickness of the gap member 166 of second trench 162 using a conventional isotropic etching process, such as RIE. By etching gap member 166 in such a manner as to reduce its thickness, the thickness $t_g$ of gap layer 170 can be made thicker than that desired for writer gap 140. Accordingly, the limitation imposed by the required thickness of writer gap 140 can be avoided.

FIGS. 7.1–7.3 illustrate steps of another method that can be carried out after second trench 162 is formed to avoid the limitations that could be set by the thickness of writer gap 140 and to further narrow the second opening 186 in which top pole 136 is ultimately formed. Following the formation of second trench 162, shown in FIG. 5.5, at least a portion of gap member 166 (first gap portion) is removed using a conventional anisotropic etching process, such as RIE, all of which is shown as being removed in FIG. 7.1. The completion of this step forms a modified second trench 162' that is deeper than second trench 162 (FIG. 5.5). Due to the limitations of conventional photolithographic processes, an insulating layer used to prevent the etching of second side walls 164 of gap layer 170 while leaving gap member 166 exposed cannot be accurately formed on gap layer 170. As a result, second side walls 164 of gap layer 170 will be partially etched such that their height is reduced slightly to form second side walls 164'. This reduction in the height of second side walls 164 is overcome by initially forming first and second trenches 156 and 162 deep enough such that the loss in height of second side walls 164 has a negligible effect on the ultimate formation of top pole 136. Although particular designs will vary from design to design, the depth of first and second trenches 156 and 160 can be, for example, approximately 1.0 µm rendering the loss of approximately 0.15 µm insignificant. As a result of this step, second opening 186 has been deepened to form second opening 186' having the second width $W_2$.

The next step of the method, depicted in FIG. 7.2, involves forming a third trench 192 within second trench 162'. Third trench 192 is formed by electroplating a second gap layer 194 to the exposed conductive surfaces that remain of first gap layer 170 and, if exposed due to the removal of gap member 166, top surface 154 of bottom pole 138. Second gap layer 194 is formed of one or more layers of a conductive nonmagnetic material, such as that used to form gap layer 170. Third trench 192 includes third side walls 196 formed on inside edges 188 (FIG. 5.5) of second side walls 164' and a gap member 198 formed either on top of a remaining portion (not shown) of first gap member 166 of second trench 162' or on the exposed top surface 154 of bottom pole 138 located between third side walls 196.

A third opening 200 of third trench 192 is defined by inside edges 202 of third side walls 196 and a top surface 204 of gap member 198. Third opening 200 has a third width $W_3$ that is narrower than second width $W_2$ (FIG. 4) by twice the thickness $t_{g2}$ of gap layer 194. As in the previous method, the preferred maximum thickness of $t_{g2}$, or $t_{g2}$ and the remaining thickness of gap member 166, is equal to the desired thickness for writer gap 140. However, it is possible to form gap layer 194 with a thickness $t_{g2}$ that results in the formation of a writer gap 140 that is thicker than desired, provided that the gap layer 194 is etched to reduce its thickness to within the desired range, as discussed above.

In the final step, shown in FIG. 7.3, top pole 136 is formed by conventional deposition or plating methods within third opening 200 of third trench 192 using a conventional plating or sputter deposition process. The resulting write element 134 can then be lapped in accordance with conventional methods to remove insulating layer 174 and any portion of top pole 136 that lies outside of third trench 192 to ensure that top pole 136 is completely contained within third trench 192. Accordingly, this method results in the formation of a top pole 136 that can be formed considerably narrower than what would be possible using conventional photolithographic methods while avoiding the limitations set by the required thickness of writer gap 140.

In summary, one aspect of the present invention is directed to a method of forming a narrow top pole (136) of a write element (134) for use in a head (130) of a disc drive storage system (100). In one embodiment, the method involves first forming a first trench (156) on a top surface (154) of a bottom pole (138). The first trench includes a first opening (178) defined by opposing first side walls (158) and an exposed portion of the top surface of the bottom pole located therebetween. Next, a second trench (162) is formed within the first trench. The second trench includes opposing second side walls (164) positioned adjacent the first side walls and a gap member (166) formed on the exposed portion of the top surface between the second side walls. The second trench defines a second opening (186) in which the top pole is formed in a final step of the method. In another embodiment of the invention, a narrow top pole (136) of a write element (134) for use in a head (130) of a disc drive storage system (100) is formed by first forming first and second trenches in accordance with the above method. In one embodiment, a thickness of the gap member (166) of second trench (162) is either reduced or the gap member is removed to expose the top surface (154) of the bottom pole (138) and form a modified second trench (162'). Next, a third trench (192) is formed within the second trench (162 or 162'). The third trench has a third opening (200) defined by opposing third side walls (196) that are formed adjacent the second side walls (164 or 164') and a gap member (198) formed on either the top of a remaining portion of first gap member (166) or on the exposed top surface (154) of the bottom pole (138) located between third side walls (196). In a final step, the top pole (136) is formed within the third opening (200).

In one embodiment of the methods of the present invention, the first trench (156) is formed by first forming a first trench opening portion (172) on the top surface (154) of the bottom pole (138), which defines the first opening (178). Next, the first side walls (158) are formed adjacent the first trench opening portion. In a final step, the first trench opening portion is removed to thereby expose the first opening. In another embodiment, the first trench (156) is formed by initially forming a first trench forming layer (180) on the top surface (154) of the bottom pole (138). The first trench opening portion is then removed to expose the desired first opening (178) and form the first trench (156). In accordance with another embodiment of the invention, the step of forming second trench (162) includes forming a gap layer (170) within the first trench (156). The gap layer includes the second side walls (164) and the gap member (166).

In yet another embodiment of the methods of the present invention, a thickness $t_g$ of the gap member (166) is reduced prior to the formation of top pole (136) within second opening (186). This provides a means for adjusting the thickness of the writer gap (140) as desired while maintaining a narrow top pole width ($W_2$).

Another aspect of the present invention is directed to a write element (134) for use in a head (130) of a disc drive storage system (100). The write element includes a bottom pole (138) having a top surface (154). A first trench (156) is formed on the top surface of the bottom pole. The first trench includes a first opening (178) that is defined by opposing first side walls (158) and an exposed portion of the top surface located therebetween. A second trench (162) is formed within the first trench and includes a second opening (186) that is defined by opposing second side walls (164) that are adjacent the first side walls, and a gap member (166) formed on the exposed portion of the top surface between the second side walls. A top pole (138) is formed within the second opening.

In one embodiment, the first trench (156) has a first width is ($W_1$) defined as a distance separating inside edges (160) of the first side walls (158). The first width is generally limited to the accuracy of conventional photolithographic techniques, which presently allows for first widths within a range of approximately 0.6–1.0 µm.

In another embodiment, the second trench (162) of the write element includes a gap layer (170) that forms the second side walls (164) and the gap member (166). The gap layer can have virtually any desired thickness. In one embodiment, the thickness $t_g$ is within a range of approximately 0.05–0.15 µm.

In yet another embodiment, the second trench (162) has a second width ($W_2$) defined as a distance separating inside edges (188) of the second side walls (164) that is within a range of approximately 0.1–0.5 µm.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. In addition, although the preferred embodiments described herein are directed to a narrow top pole of a write element for use in a disc drive storage system, it will be appreciated by those skilled in the art that the teachings of the present invention can be applied to other systems without departing from the scope and spirit of the present invention. For example, the methods of the present invention can be used to form other narrow structures such as conductors in an integrated circuit.

Additionally, those skilled in the art understand that as processing techniques evolve, structures having even smaller dimensions than those mentioned herein can be obtained using the method of the present invention.

What is claimed is:

1. A write element for use in a head of a disc drive storage system comprising:

a bottom pole having a top surface;

a first trench formed on the top surface of the bottom pole having a first opening defined by opposing first side walls and an exposed portion of the top surface located therebetween;

a second trench formed within the first trench and having a second opening defined by opposing second side walls adjacent the first side walls, and a gap member formed on the exposed portion of the top surface between the second side walls; and a top pole formed within the second opening.

2. The write element of claim 1, wherein the first trench has a first width defined as a distance separating inside edges of the first side walls that is within a range of approximately 0.6–1.0 micrometer.

3. The write element of claim 1, wherein the second trench includes a gap layer that forms the second side walls and the gap member.

4. The write element of claim 3, wherein the gap layer has a thickness within a range of approximately 0.05–0.15 micrometers.

5. The write element of claim 1, wherein the second trench has a second width defined as a distance separating inside edges of the second side walls that is within a range of approximately 0.1–0.5 micrometers.

6. A write element of a head for use in a disc drive storage system comprising:

a bottom pole having a top surface;

a trench means having a narrow opening on the top surface of the bottom pole; and a top pole formed in the narrow opening.

7. The write element of claim 6, wherein the trench means includes:

a first trench formed on the top surface of the bottom pole having a first opening defined by opposing first side walls and an exposed portion of the top surface located therebetween; and a second trench formed within the first trench and having the narrow opening defined by opposing second side walls adjacent the first side walls, and a gap member formed on the exposed portion of the top surface between the second side walls.

8. The write element of claim 7, wherein the second side walls and the gap member are formed by a gap layer.

9. The write element of claim 7, wherein the second trench is electroplated to the first trench.

10. The write element of claim 6, wherein the narrow opening is less than 0.6 micrometers.

11. A write element for use in a head of a disc drive storage system comprising:

a bottom pole having a top surface;

a first trench formed on the top surface of the bottom pole having a first opening defined by opposing first side walls and an exposed portion of the top surface located therebetween, the first side walls being formed of an electrically conductive material;

a second trench formed within the first trench and having a second opening defined by opposing second side walls each electroplated to one of the first side walls, and a gap member electroplated to the exposed portion of the top surface of the bottom pole between the second side walls; and a top pole formed within the second opening.

12. The write element of claim 11, wherein the first trench has a first width defined as a distance separating inside edges of the first side walls that is within a range of approximately 0.6–1.0 micrometer.

13. The write element of claim 11, wherein the second trench includes a gap layer that forms the second side walls and the gap member.

14. The write element of claim 13, wherein the gap layer has a thickness within a range of approximately 0.05–0.15 micrometers.

15. The write element of claim 11, wherein the second trench has a second width defined as a distance separating inside edges of the second side walls that is within a range of approximately 0.1–0.5 micrometers.

* * * * *